April 4, 1967 E. RUCHSER 3,312,240
HYDRAULIC CONTROL ARRANGEMENT FOR AN ELEVATOR
Filed Oct. 16, 1964 6 Sheets-Sheet 1

INVENTOR.
Erich Ruchser
BY Richard Ernst
ag't

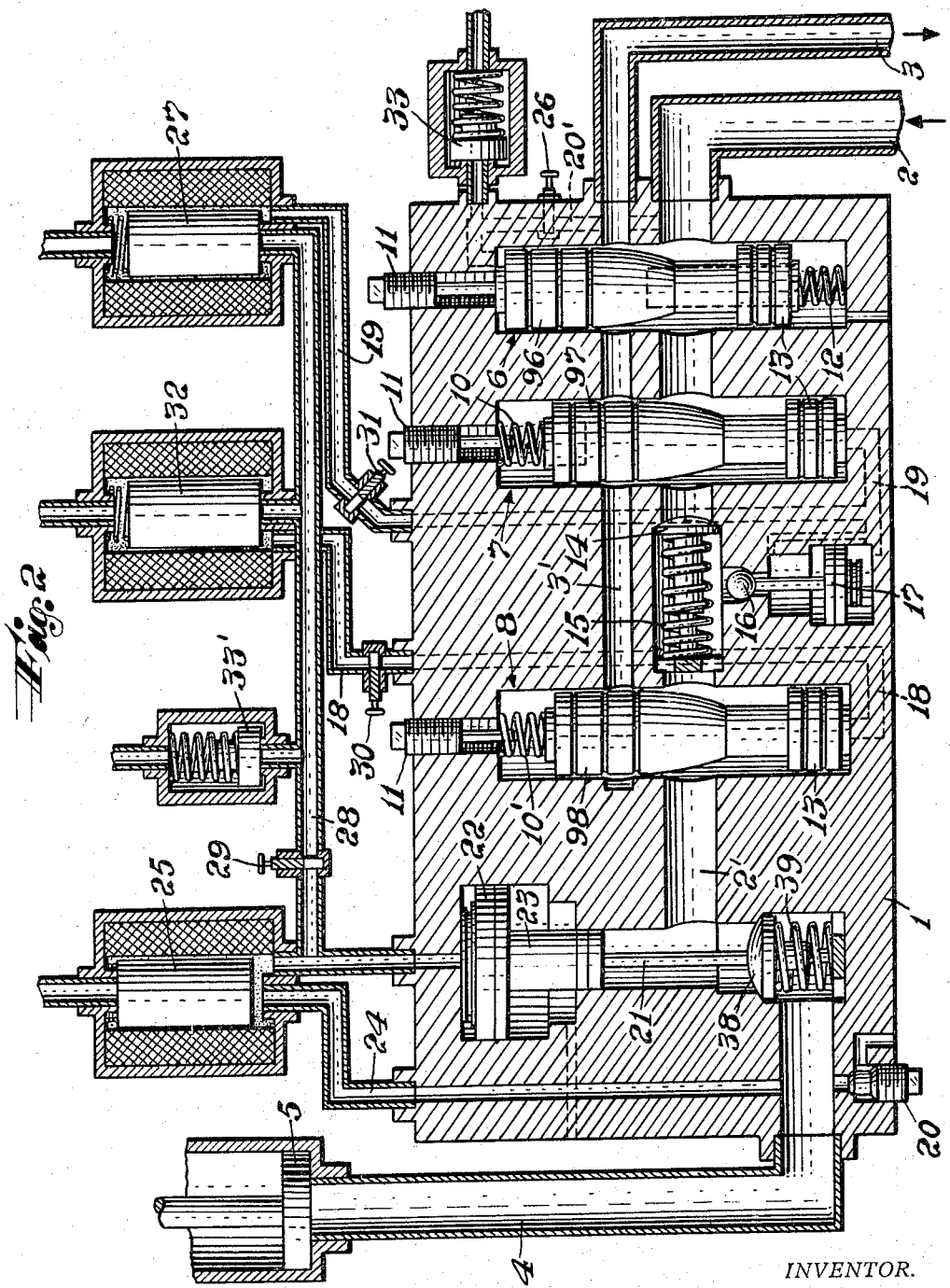

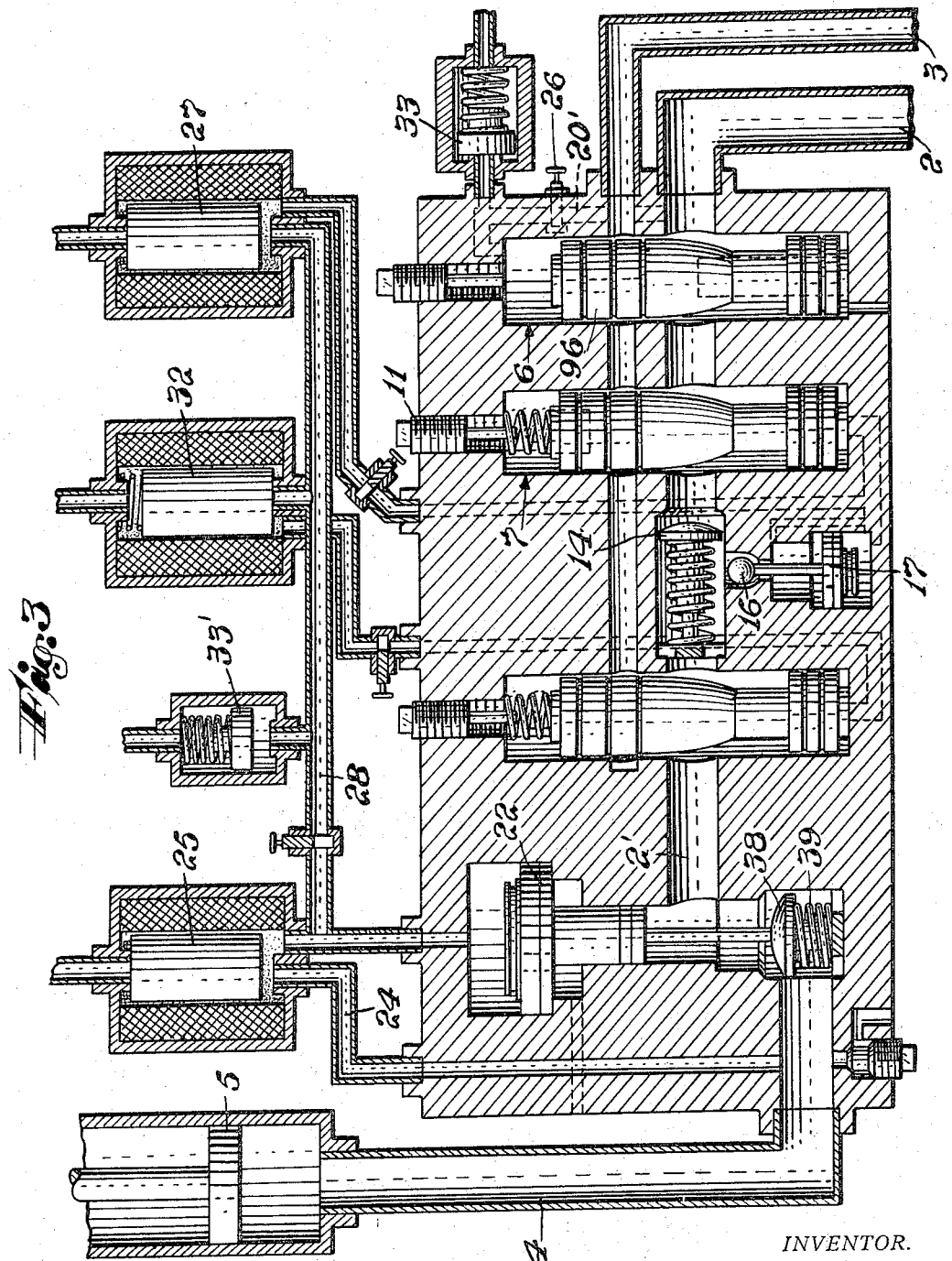

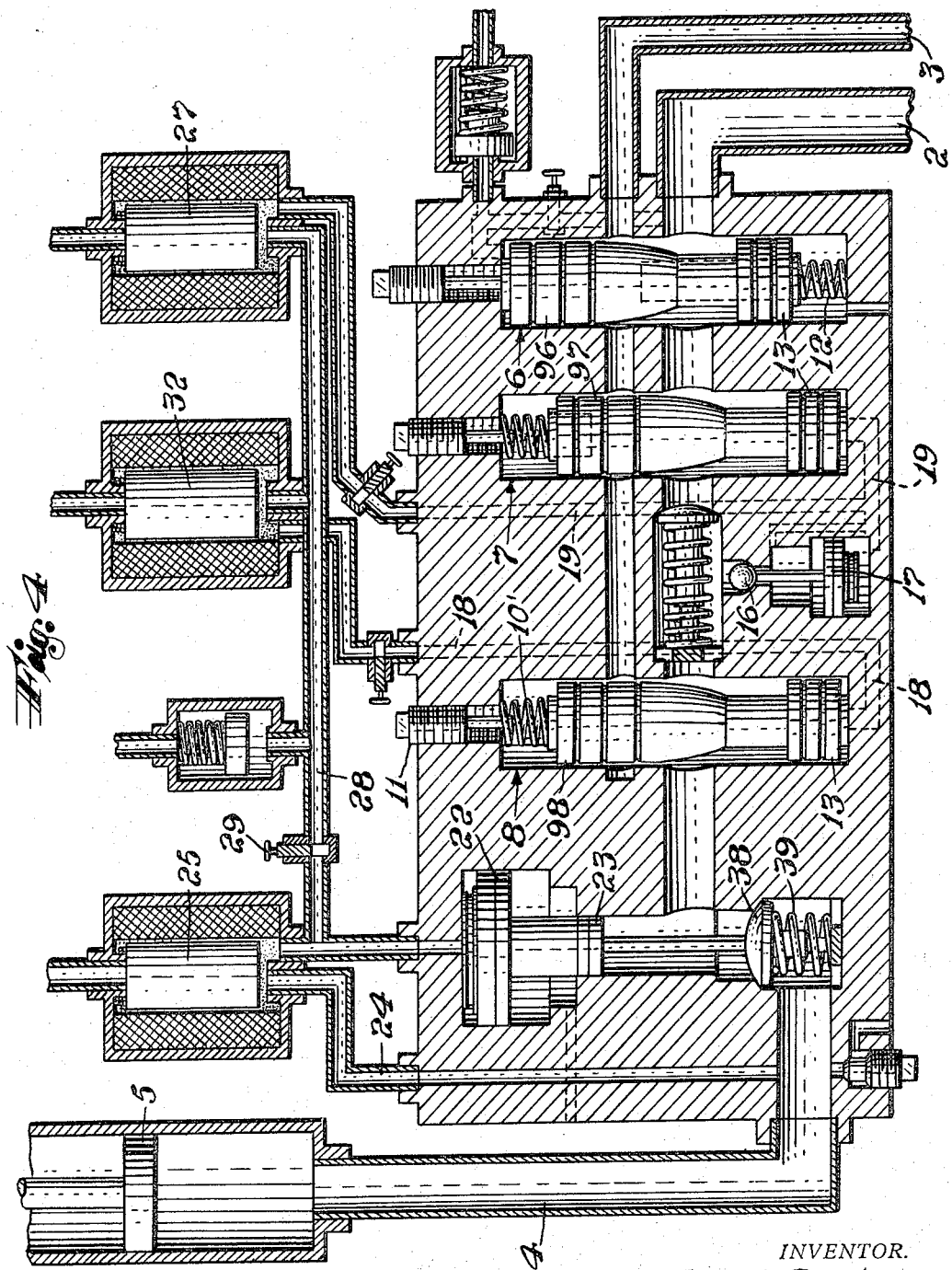

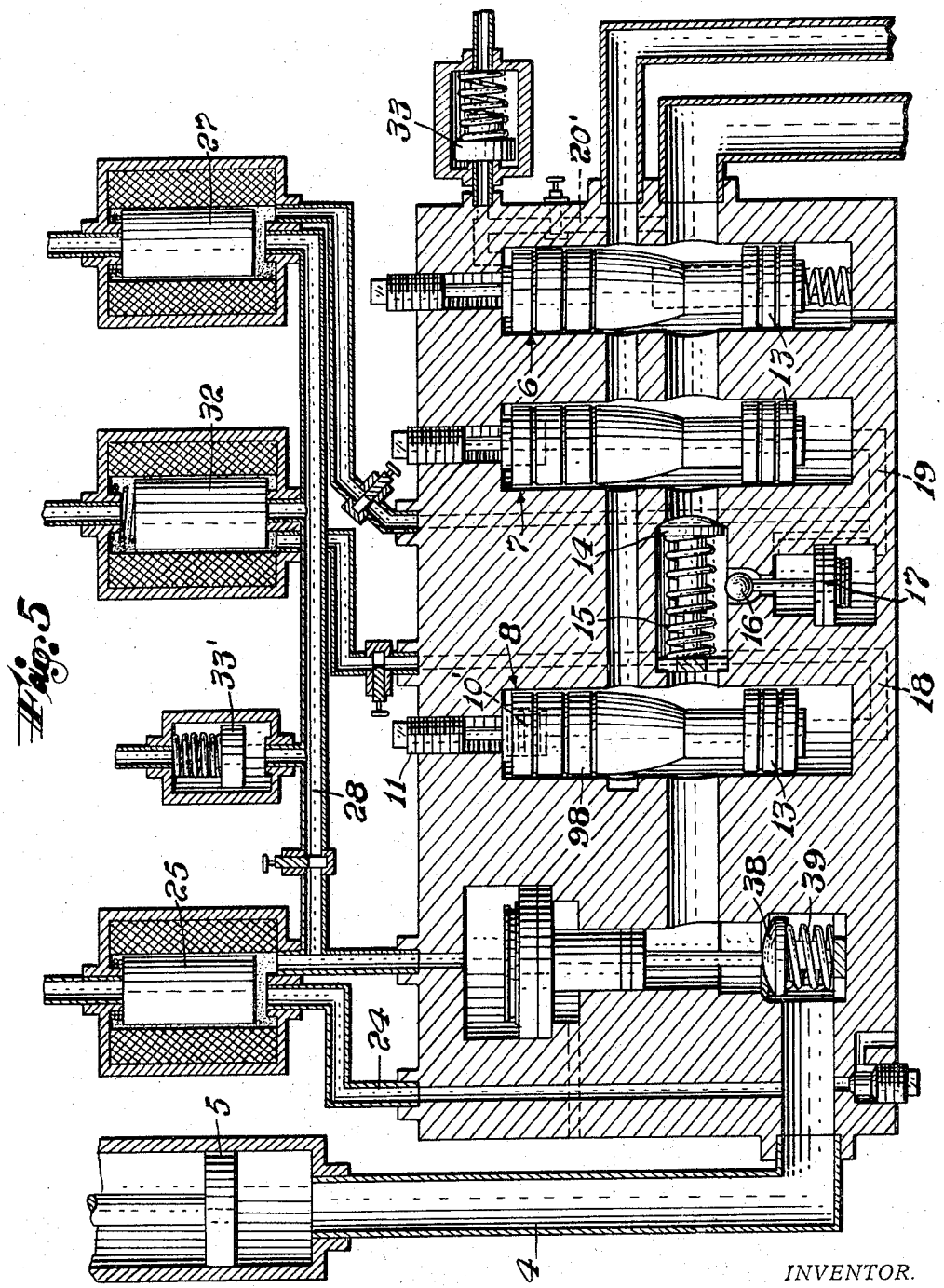

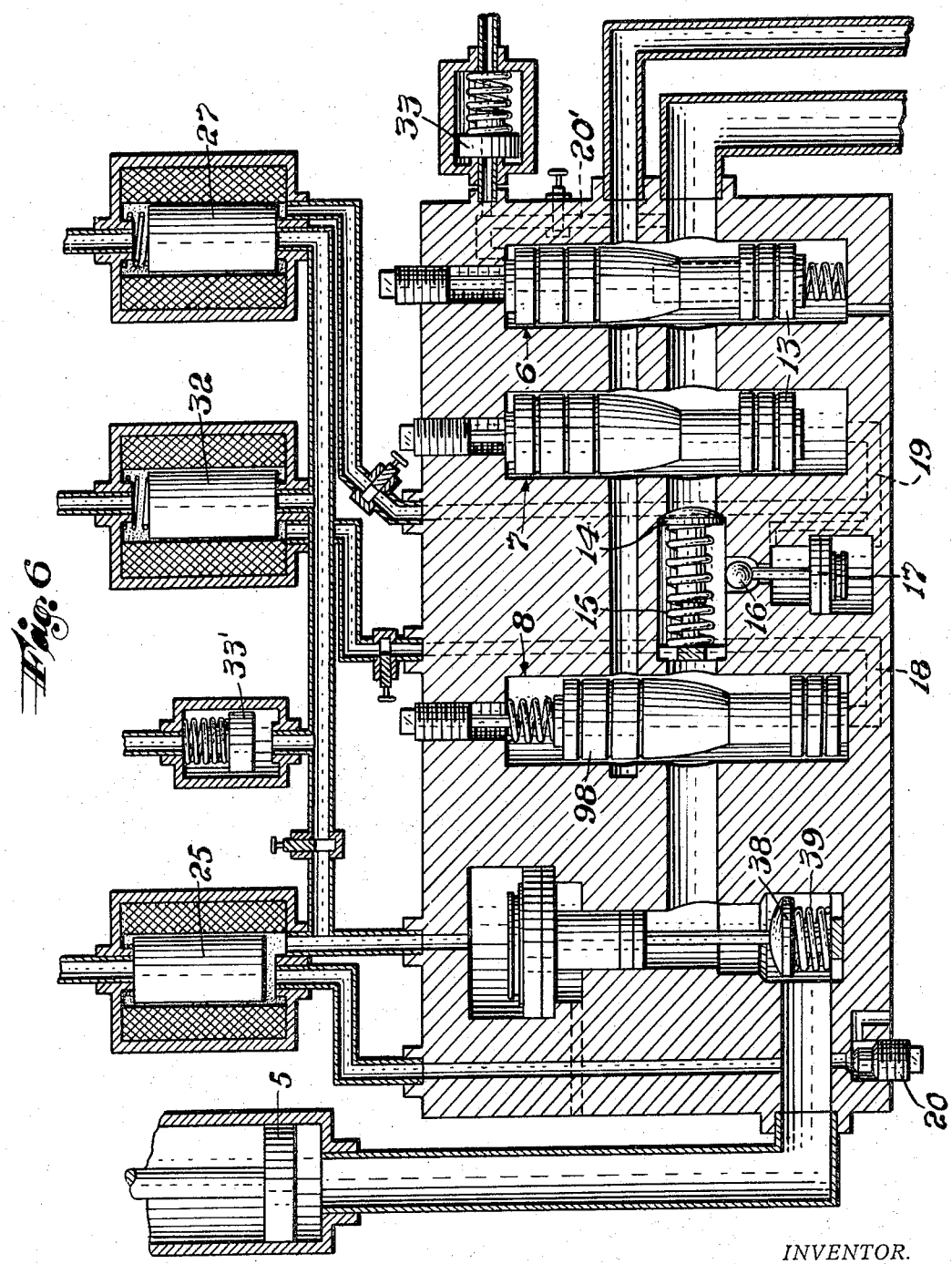

United States Patent Office 3,312,240
Patented Apr. 4, 1967

3,312,240
HYDRAULIC CONTROL ARRANGEMENT FOR
AN ELEVATOR
Erich Ruchser, Rommelshausen, Germany, assignor to
Erich Herion, Stuttgart-Frauenkopf, Germany
Filed Oct. 16, 1964, Ser. No. 404,532
15 Claims. (Cl. 137—596.12)

This application is a continuation-in-part of my application Ser. No. 346,046, filed Feb. 19, 1964, now abandoned. The present invention relates to hydraulic machinery, and particularly to a control arrangement for hydraulically operated elevators and similar devices in which an object is to be precisely positioned by means of a hydraulic actuator.

It is known to control the movement of hydraulically operated elevators by means of electrically operated valves. Switches mounted in the elevator cage or near the elevator shaft are connected with the valves by electrical circuits that may include relays to permit manual, semi-automatic, or fully automatic elevator operation. It is difficult precisely to control the level at which the elevator cage is stopped by the known valve arrangements, and special means must be provided for inching the elevator cage to the desired level after that level has been overshot. This well known problem is aggravated by the inherent variation in the travel speed of economically practical hydraulic elevators in response to variation in the load.

Another serious problem arises in known valve controls of hydraulically operated elevators from the leakage of the hydraulic fluid.

The primary object of this invention is the provision of a control arrangement for a hydraulically operated elevator and analogous apparatus which permits an elevator cage and the like to be moved with precision from one position to another without overshooting the goal, and without need for reverse inching.

Another object is the provision of a control arrangement which can handle the high-pressure hydraulic fluid without leakage losses, and yet requires but a minimum of maintenance work.

More specifically, the invention aims at providing elevator controls which provide smooth acceleration of elevator movement without shock, and smooth deceleration to a stop in a precisely predetermined position.

With these and other objects in view, the invention, in one of its aspects, connects a source of pressure fluid, such as a pump, with the hydraulic apparatus to be controlled, and with a return line by a control arrangement which includes two conduits. The end portions of the first conduit which is elongated are normally connected to the source of pressure fluid and to the controlled apparatus, the second conduit is connected to the return line. Three by-pass valves are interposed between the two conduits. A normally open and a normally closed by-pass valve connect the end portion of the first conduit near the pressure fluid source to the second conduit, and the third by-pass valve, which is normally closed, connects the second conduit with the other end portion of the first conduit near the controlled apparatus. A check valve in the first conduit normally separates the two end portions thereof, and yields to a predetermined pressure of fluid from the afore-mentioned source to connect the two end portions. A shut-off valve is provided in the first conduit between the third by-pass valve and the controlled apparatus The several by-pass valves and the shut-off valve are operated in timed sequence.

Other features and many of the attendant advantages of this invention will be readily appreciated as the same becomes better understood by reference to the following detailed description of a preferred embodiment when considered in connection with the accompanying drawing in which:

FIG. 1 diagrammatically illustrates the operation of an elevator equipped with the control arrangement of the invention;

FIG. 2 shows the control arrangement in elevational section;

FIGS. 3 to 6 illustrate the device of FIG. 2 in different operating positions;

Figure 1:
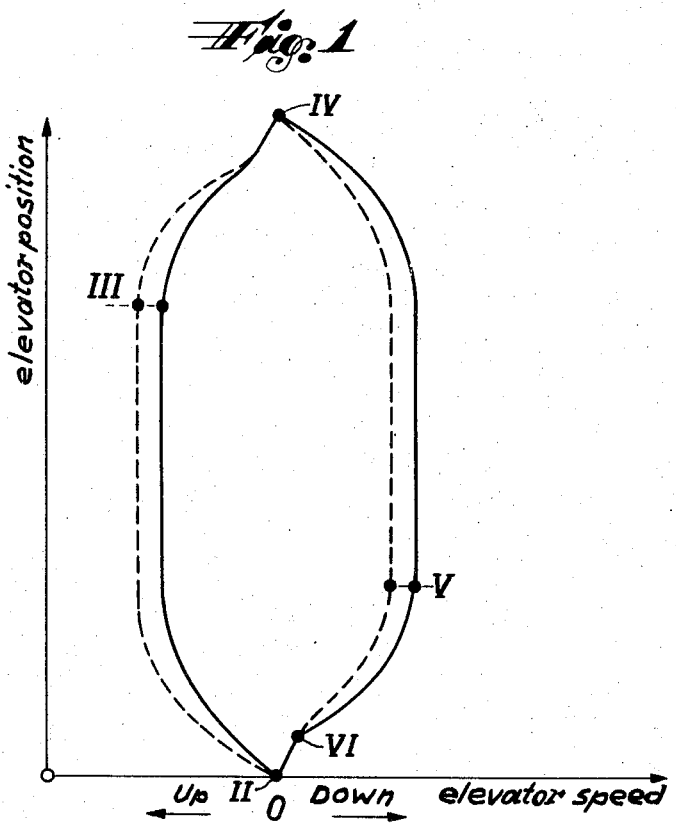

Referring now to the drawing, and initially to FIG. 1, there is seen the operating diagram of an elevator which is raised and lowered by a hydraulic motor controlled by the apparatus shown in FIGS. 2 to 6. The diagram is a plot of the speed of the elevator cage indicated on the abscissa versus the vertical cage position, shown as the ordinate. Lines to the left of abscissa value 0 relate to upward travel of the cage, lines to the right of 0 to descending cage movement. Fully drawn lines represent the movements of the empty cage, broken lines the movements of the cage when loaded to rated capacity. Roman numerals II to VI indicate the cage levels at which the control mechanism is switched to the positions respectively shown in FIGS. 2 to 6.

As seen in FIG. 1, the elevator cage when started by manual controls, moves upward from the starting position II at a speed which gradually increases. When the elevator reaches the level III, it actuates switches, not further illustrated, which cause the control mechanism to move into the position illustrated in FIG. 3, whereby the upward rate of travel is slowed down until an upper level is approached at a substantially uniformly decreasing speed. When the elevator reaches the upper level IV, it actuates limit switches which automatically shift the control mechanism into the position illustrated in FIG. 4.

Manually operated controls initiate the downward movement of the cage at a rate which gradually increases to a constant value until switches actuated by the elevator upon reaching the level V shift the control mechanism to the condition shown in FIG. 5, and cause a gradual reduction in cage speed. At level VI, the control mechanism is shifted into the condition shown in FIG 6. Upon return to the ground level, the elevator is stopped automatically.

The rate of upward elevator acceleration, and the maximum upward speed are higher with an empty elevator cage than with the loaded cage, and this relationship is reversed during downward elevator travel as is usual in hydraulically operated elevators. The afore-mentioned switches which open and close control circuits when the elevator reaches certain levels have not been illustrated since they are well known in this art, nor have the manual control switches in the elevator cage and on control boards near the elevator shaft been shown since they are not at the core of this invention. Their cooperation with the control arrangement and the elevator cage will be evident from the following description of the control arrangement with which this invention is more particularly concerned.

As shown in FIG. 2, many of the operating elements of the control apparatus are assembled in a common casing 1. A pressure line 2 connects the casing with a non-illustrated pump for supply of hydraulic fluid. The fluid is drained through a return line 3 to a non-illustrated sump. The apparatus controls flow of hydraulic fluid through a controlled outlet line 4 to the hydraulic motor 5 of the elevator which is not otherwise shown.

The pressure line 2 and return line 3 are connected to respective conduits 2', 3' in the casing 1. Three by-pass piston valves 6, 7, 8 are arranged to open and close connecting passages between the conduits 2', 3'. The pistons 96, 97, 98 of the bypass valves are of circular cross section and are slidable in the bores of respective cylindrical sleeves. The conduits 2', 3' have respective orifices in the valve sleeves, and the orifices of the conduit 3' may be blocked by the valve pistons The pistons taper in a direction from the conduit 3' to the conduit 2'. Upward movement of the pistons (as viewed in FIG. 2) is limited by respective threadedly adjustable abutments 11 which partly project from the casing 1. Springs 10, 10' normally hold the pistons 97, 98 in the closed position, whereas the piston 96 is biased toward its open position by a spring 12.

Movement of the pistons 96, 97, 98 against the respective springs 10, 10', 12 is actuated by hydraulic fluid which is admitted into axially terminal actuator portions of the valve bores. Sealing rings 13 on the lower end portions of the pistons loosely engage the walls of the corresponding valve bores to define actuating chambers. Similar rings 13 on the piston 96 merely guide the piston whose main portion bounds an actuating chamber near the abutment 11.

A check valve 14 in the conduit 2' is held in a normally closed position by a spring 15, but opens upon admission of pressure fluid through the line 2 and the valves 6 and 7 to pass the fluid to the valve 8. An auxiliary drain valve 16 communicates with a portion of the conduit 2' between the check valve 14 and the piston valve 8, and is normally held closed by the fluid pressure in the conduit 2'. A piston 17 is provided to open the drain valve 16 against the fluid pressure in the conduit 2'.

The portion of the conduit 2' behind the piston valve 8 in the direction of hydraulic fluid flow from the non-illustrated pump is connected to the controlled outlet 4 by a hydraulically operated shut-off valve 38 which is a globe valve biased by a spring 39 toward the closed position. The valve 38 is connected by a stem 21 to an actuator piston 22. A portion 23 of the piston which is exposed to the fluid pressure in the conduit 2' and which faces the valve 38 has an effective surface area smaller than that of the valve 38 in the closed position thereof so that fluid pressure in the conduit 2' tends to open the valve 38. A manual drain cock 20 on the controlled outlet 4 permits hydraulic fluid to be released from the hydraulic motor 5 while the globe valve 38 blocks communication between the motor and the main section of the control device.

The movements of the valve pistons 96, 97, 98, and of other elements of the apparatus described so far are actuated by presure fluid supplied through two servo circuits. One circuit consists of a duct 20' which branches from the conduit 2' ahead of the valve 6 and leads to the actuator chamber of the last-mentioned valve. A throttle 26 in the duct 20' and a relief valve 33 normally closed under spring pressure and communicating with a portion of the duct between the throttle and the piston valve 6 maintain a constant reduced pressure in the actuator chamber of the piston valve as long as the non-illustrated pump supplies fluid. The reduced pressure may be adjusted by varying the spring pressure in the valve 33 or by varying the effective flow section of the throttle in a known manner.

The second servo circuit is supplied with hydraulic fluid through a duct 24 which branches from the controlled outlet 4. It includes three solenoid-operated servo valves 25, 32, 27 and a relief valve 33' which are mounted on the top of the casing 1 and connecting ductwork. The solenoid valves each have three openings of which one, shown at the top in FIG. 2, is connected to the sump. When the valve solenoid is energized, as exemplified by valve 25 in FIG. 2, the sump connection is closed, and the other two openings are connected with each other. When the solenoid is without current, a return spring moves the valves into the positions shown at 32 and 27 in which the sump connection communicates with one of the other two valve openings while the third opening is blocked.

The valve 25 is arranged to open and to block the fluid supply duct 24. In the illustrated position, the valve connects the supply duct 24 to the actuator piston 22 of the globe valve 38, and also to a manifold 28 in which an adjustable reduced fluid pressure is maintained by a throttle 29 and a relief valve 33'. A venting passage from below the piston 22 is shown in dotted lines. As shown in FIG. 2, the solenoid valves 32, 27 block communication between the manifold 28 and ducts 18, 19 which lead from the valves to the actuator chambers of the piston valves 7, 6 respectively, and are vented to the sump in the illustrated deenergized position of the solenoid valves.

Throttles 30, 31 which are manually adjustable in a manner not further illustrated permit the flow of fluid through the ducts 18, 19 to be controlled. The duct 19 also communicates with the actuator piston 17 of the auxiliary drain valve 16.

The condition of the control apparatus illustrated in FIG. 2 is brought about by the conventional manual starting controls of the elevator. When an "Up" button of the elevator is pressed, non-illustrated relays energize the motor of the hydraulic pump and the solenoid of the valve 25. Referring to FIG. 2, hydraulic fluid flows from the pressure line 2 through the valve 6 into the return line 3. Fluid also is admitted through the duct 20' to the actuator chamber of the valve 6 above the piston 96. Because the main portion of the piston 96 has the same outer diameter as the sealing rings 13, the effective piston faces of the main portions and of the rings are opposite and equal. The fluid pressure in the conduit 2' does not produce a resulting axial force acting on the piston, and axial movement of the piston can be actuated by relatively low pressure in the duct 20', for example, 60 p.s.i. gage pressure. Tight sealing engagement between the piston and the valve bore is unnecessary.

The gradual downward movement of the piston 96 throttles, and eventually blocks significant fluid flow from the conduit 2' into the conduit 3', and the fluid pressure in the conduit 2' rises until it is sufficient to open the check valve 14, and shortly thereafter the globe valve 38. The latter is opened gradually against its restraining spring 39, and the fluid admitted to the motor 5 causes the cage to rise in a smoothly accelerated movement as increasing fluid pressure downstream from the globe valve is transmitted to the actuator piston 22 and hastens opening of the valve. When the valve 38 is fully opened, the elevator rises at constant speed.

As the elevator approaches the upper level, it trips switches which cause the solenoid of the valve 27 to be energized as is seen in FIG. 3. Pressure fluid is admitted from the manifold 28 to the actuator chamber of the piston valve 7 and to the piston 17 of the auxiliary drain valve 16. The rate of supply of pressure fluid to the controlled outlet line 4 is gradually reduced by by-passing to the return line 3 in the valve 7, and by draining to the sump through the opened valve 16. The rate of deceleration may be set in any desired manner by suitably positioning the abutment 11 in the valve 7.

As the elevator cage slowly enters the top position, it trips switches which deenergize the solenoid of the valve 25. The actuator 22 of the globe valve 38 is vented to the sump by the valve 25. The pressure in the conduit 2' behind the open auxiliary drain valve 16 is not sufficient to keep the globe valve 38 open, and the valve is quickly closed, whereby the elevator is stopped on the upper level. Overshooting of that level can readily be avoided by proper setting of the abutments 11, and an inching reverse movement is not necessary for proper leveling of the elevator cage.

With the valves 38 and 25 being in their normal closed positions, the pump may also be deenergized, and the elevator cage is held in its top position. The check valve 14 closes and the piston 96 is shifted upward by the spring.

Pushing of a "Down" button energizes the solenoids of the three servo valves 25, 27, 32, as shown in FIG. 4. The pressure fluid discharged from the motor 5 under the weight of the elevator cage opens the globe valve 38 by means of its piston 22 and passes through the feed conduit 24 and the valves 25, 32 into the actuating chamber of the valve 8 to shift the piston 98 into the upper position in which it releases fluid to the return line 3 at an ultimate rate which may be adjusted by setting the corresponding abutment 11. The piston 97 also is shifted and the valve 16 is opened. The speed at which downward movement of the elevator cage starts is set by the more quickly opening auxiliary drain valve 16.

When the elevator cage passes the position V in FIG. 1, it trips switches which causes the valve 32 to be deenergized, as shown in FIG. 5. The valve piston 98 returns to its normal position under the urging of the spring 10'. The rate of further fluid release from the motor 5 is then controlled by the auxiliary drain valve 16 as shown in FIG. 6. When the elevator cage reaches the bottom level, additional tripping switches close the servo valves 25, 27 in a manner not further illustrated. The globe valve 38 is quickly closed, and the elevator stops.

While the operations of the control arrangement of the invention has been described with reference to an elevator which moves between two levels, the control arrangement is not limited to any specific number of elevator levels, and may be adapted to any number thereof merely by addition of the necessary tripping switches and relays in a manner well known in this art.

The control arrangement of the invention is capable of long trouble-free operation because it includes only one high-pressure valve that needs to be maintained in tightly sealing condition, namely the globe valve 38. The piston valves 6, 7, 8 are fully operative as long as they offer reasonable resistance to the flow of liquid between their pistons 96, 97, 98 and the associated valve bores. The solenoid valves 25, 27, 32 operate at relatively low pressures and are not subject to rapid wear.

Figure 7:
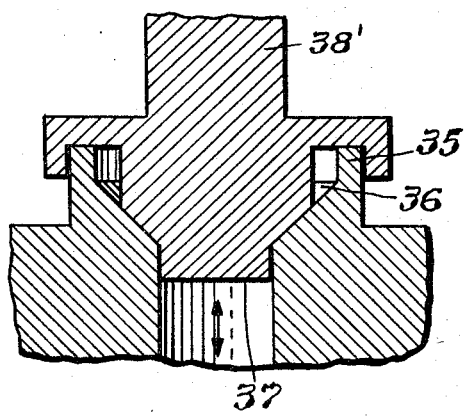
FIG. 7 shows a modified closed valve for use in the apparatus of FIGS. 2 to 6 on an enlarged scale.
Figure 8:
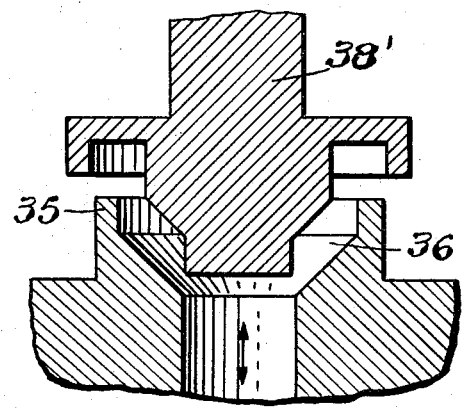
FIG. 8 shows the valve of FIG. 7 in the open position.

If smooth stopping of the elevator cage in the event of power failure is important, the globe valve 38 may be modified in the manner illustrated in FIGS. 7 and 8. It will be appreciated that the valve 38 closes rather abruptly if the current supply to the energized valve 25 is interrupted. The modified valve avoids sudden elevator stoppage in such an event.

The valve 38' is provided with a labyrinth seal 36 and engages a valve seat 35 by movement in a downward direction.

During closing movement of the valve 38', the flow of pressure fluid through the gradually contracting valve channel delays closing of the valve, and the elevator cage is brought to an emergency stop in a more gradual manner than is possible with the valve 38.

If the emergency stop leaves the cage at a level between exists of the elevator shaft, the cage may be lowered by manually opening the drain cock 20.

The use of solenoid-operated servo valves in the illustrated control arrangement is practical because of the arrangement of pressure balancing faces on the movable elements of the by-pass valves 7, 8 and of the shut-off valve 38. The pressure fluid in the conduit 2' exerts as much axial pressure on the main portions of the valve pistons 97, 98 as on the corresponding sealing rings 13, and the pistons are therefore shifted between their operative positions by small amounts of hydraulic fluid operating at the low pressures which can be effectively and economically controlled by fast acting solenoid valves of the type illustrated. The opposite faces of the valve 38 and of the piston portion 23 are intentionally mismatched to a small extent to cause automatic slow opening of the valve 38 under the pressure of the operating fluid. The resulting axial forces to be overcome by the piston 22 still are very small.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:
1. In a hydraulic control arrangement, in combination:
   (a) an elongated first conduit having one end portion adapted to be connected to a source of pressure fluid, the other end portion of said conduit being adapted to be connected to an apparatus to be controlled by said arrangement;
   (b) a second conduit adapted to be connected to a return line;
   (c) two by-pass valves interposed between said one end portion and said second conduit;
   (d) a third by-pass valve interposed between said other end portion and said second conduit;
   (e) a check valve arranged in said first conduit between said end portions thereof for connecting said end portions in response to a predetermined fluid pressure in said one end portion,
      (1) one of said two by-pass valves being normally open, and
      (2) the other one of said two by-pass valves and said third by-pass valve being normally closed;
   (f) a shut-off valve in the other end portion of said first conduit and spaced from said third by-pass valve in a direction away from said check valve; and
   (g) actuating means for operating said by-pass valves and said shut-off valve in timed sequence.

2. In an arrangement as set forth in claim 1, said actuating means including a hydraulic actuator, a servo conduit connecting said actuator to said first conduit, a servo valve in said conduit, throttle means in said servo conduit for limiting flow therethrough, and relief valve means communicating with a portion of said servo conduit intermediate said throttle means and said actuator for maintaining in said portion of said servo conduit a fluid pressure lower than the fluid pressure in said first conduit when the same is connected to said source.

3. In an arrangement as set forth in claim 1, an auxiliary drain valve communicating with a portion of said first conduit intermediate said check valve and said third by-pass valve, said actuating means including means for operating said auxiliary by-pass valves.

4. In an arrangement as set forth in claim 1, said shut-off valve including a valve member arranged in said first conduit for movement toward a valve-closing position in a direction from said other toward said one end portion, and having an exposed face transverse of said direction when in said valve-closing position, said actuating means including an actuator member connected to said valve member for joint movement therewith, said actuator member having an exposed face transverse of said direction and facing the face of said valve member, said face of said actuator member having a smaller area than the face of said valve member.

5. In an arrangement as set forth in claim 1, a manually operable drain cock communicating with said other end portion at a point thereof spaced from said shut-off valve in a direction away from said one end portion.

6. In an arrangement as set forth in claim 1, said by-pass valves each including a piston member arranged for movement between a position in which said piston member permits fluid flow between said first and second conduits and a position in which said piston member substantially blocks said flow, and adjustable abutment means in at least one of said by-pass valves for limiting movement of said piston member toward one of said positions thereof.

7. In an arrangement as set forth in claim 1, said shut-off valve being a globe valve.

8. In an arrangement as set forth in claim 1, said shut-off valve including a valve seat in said first conduit, a valve member arranged for movement in a direction from said one toward said other end portion for valve-closing engagement with said seat, and a labyrinth seal on said valve member and interposed between said valve member and said valve seat during said valve-closing engagement.

9. In an arrangement as set forth in claim 1, said by-pass valves each including a piston member movable in a direction transverse to the direction of elongation of said first conduit toward and away from a position in which said piston member blocks flow of fluid between said first and second conduits, said piston member having two piston faces of substantially equal effective area opposite each other in said direction and exposed to fluid in said first conduit.

10. In an arrangement as set forth in claim 9, said actuating means including a hydraulic actuator operatively connected to one of said by-pass valves, a servo conduit connecting said actuator to said first conduit, and a solenoid-operated servo valve in said servo conduit.

11. In an arrangement as set forth in claim 9, said by-pass valves each including sleeve means, said piston member being guided in said sleeve means in said transverse direction, and loosely engaging said sleeve means.

12. In an arrangement as set forth in claim 11, said sleeve means defining a valve bore of substantially uniform cross section in the direction of movement of said piston member, and said piston member tapering in said direction of movement, said first and second conduits having respective orifices in portions of said valve bore spaced in said direction of movement.

13. In an arrangement as set forth in claim 1, said actuating means including hydraulic actuator means operatively connected to said shut-off valve, a servo conduit communicating with a section of said other end portion spaced from said shut-off valve in a direction away from said one end portion and said actuator means, and a servo valve in said servo conduit.

14. In an arrangement as set forth in claim 13, said actuating means further including a manifold connected to a portion of said servo conduit spaced from said servo valve in a direction away from said other end portion, respective hydraulic actuators operatively connected to said third by-pass valve and to the normally closed one of said two by-pass valves, and respective additional servo valves interposed between said manifold and said hydraulic actuators.

15. In an arrangement as set forth in claim 14, said actuating means further including hydraulic actuating means communicating with said one end portion of said first conduit for receiving pressure fluid therefrom, and operatively connected to the normally open one of said two by-pass valves for operating the same under the pressure of the received fluid.

References Cited by the Examiner
UNITED STATES PATENTS 2,363,235   11/1944   Ellinwood _____ 137—596.12 XR
2,893,355   7/1959   Bauer _____ 137—596.12 XR M. CARY NELSON, *Primary Examiner.*